(12) United States Patent
Helda et al.

(10) Patent No.: US 7,086,166 B2
(45) Date of Patent: Aug. 8, 2006

(54) SPIRIT LEVEL WITH INTEGRATED INCLINATION ADJUSTMENT MECHANISM

(75) Inventors: Eric John Helda, Cornelius, NC (US); Leslie Daily Gist, Huntersville, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 0 days.

(21) Appl. No.: 10/847,530

(22) Filed: May 17, 2004

(65) Prior Publication Data

US 2005/0252016 A1 Nov. 17, 2005

(51) Int. Cl.
*G01C 9/00* (2006.01)
*G01B 1/00* (2006.01)

(52) U.S. Cl. .............................. 33/375; 33/376; 33/529

(58) Field of Classification Search .......... 33/374–377, 33/412, 529, DIG. 1
See application file for complete search history.

(56) References Cited

U.S. PATENT DOCUMENTS

| | | | |
|---|---|---|---|
| 35,298 A | 5/1862 | Cahoon | |
| 140,055 A | 6/1873 | Marston | |
| 143,942 A | 10/1873 | Thornley | |
| 363,331 A * | 5/1887 | Tiffany | 33/485 |
| 457,992 A | 8/1891 | Gillette | |
| 662,991 A * | 12/1900 | Van Luvan | 33/290 |
| 986,924 A | 3/1911 | L'Heureux | |
| 1,187,548 A | 6/1916 | Purer | |
| 1,221,644 A * | 4/1917 | Woods | 33/375 |
| 1,305,636 A | 6/1919 | Weilep | |
| 1,329,196 A * | 1/1920 | Hisashi | 33/375 |
| 1,445,570 A * | 2/1923 | Leverett | 33/375 |
| 1,460,989 A | 7/1923 | Tiffany | |
| 1,581,249 A | 4/1926 | Tiffany | |
| 1,633,854 A | 6/1927 | Frantz | |
| 1,701,069 A | 2/1929 | Frantz | |
| 1,794,254 A * | 2/1931 | Sherwood | 33/373 |
| 2,014,420 A | 9/1935 | Zieman | |
| 2,162,602 A * | 6/1939 | Black | 33/375 |
| 2,373,641 A | 4/1945 | Ackerson | |
| 2,439,698 A | 4/1948 | Shaler | |
| 2,520,700 A | 8/1950 | Thorndike | |
| 2,521,525 A * | 9/1950 | Krausser | 33/375 |
| 2,594,543 A * | 4/1952 | Douglas | 33/375 |
| 2,743,528 A | 5/1956 | Posthauer | |
| 2,915,829 A * | 12/1959 | Baxter | 33/375 |
| 3,009,250 A | 11/1961 | Schock | |
| 4,073,062 A | 2/1978 | Wright | |
| 4,205,454 A | 6/1980 | Decker | |
| 4,419,833 A | 12/1983 | Wright | |
| 4,543,731 A | 10/1985 | Boundy | |
| 4,653,193 A | 3/1987 | Kennedy et al. | |
| 5,020,232 A * | 6/1991 | Whiteford | 33/348.2 |

(Continued)

FOREIGN PATENT DOCUMENTS

GB 2 176 287 6/1985

(Continued)

*Primary Examiner*—Yaritza Guadalupe-McCall
(74) *Attorney, Agent, or Firm*—Dennis J. Williamson; Moore And Van Allen PLLC

(57) ABSTRACT

The present spirit level has an elongated body with a longitudinal leveling face and at least one inclination peg retractably mounted in the body. The inclination peg is configured to selectably extend at least partially out from the leveling face by at least one predetermined stepwise increment, such that when it contacts a surface to be leveled, the inclination peg raises the leveling face to a predetermined angle of inclination from the surface to be leveled.

55 Claims, 13 Drawing Sheets

U.S. PATENT DOCUMENTS

| | | | |
|---|---|---|---|
| 5,279,041 A * | 1/1994 | Wright | 33/379 |
| 5,575,074 A * | 11/1996 | Cottongim et al. | 33/474 |
| 6,243,961 B1 * | 6/2001 | Winski | 33/526 |
| 6,427,348 B1 * | 8/2002 | Webb | 33/286 |
| 6,477,781 B1 | 11/2002 | Blatt | |
| 6,568,095 B1 | 5/2003 | Snyder | |

FOREIGN PATENT DOCUMENTS

| | | |
|---|---|---|
| GB | 2 276 451 | 3/1993 |
| JP | 58-171618 | 3/1982 |

\* cited by examiner

SPIRIT LEVEL WITH INTEGRATED INCLINATION ADJUSTMENT MECHANISM

BACKGROUND

1. Technical Field of the Invention

The present invention relates generally to measuring tools and devices, particularly to leveling devices. More particularly, the present invention relates to a spirit level adapted with a mechanism for use in determining a minimum satisfactory inclination.

2. Background Information

Spirit levels, such as torpedo-type levels, are commonly used in a number of different technical fields including plumbing, installation of electrical conduit, sheetmetal fabrication and others. Such levels typically are small, and are therefore quite portable. Many such levels are small enough to fit easily into a pocket. Their small size also makes torpedo levels easy to use in close quarters where a box-style or I-beam level would be unwieldy and inconvenient. Torpedo levels are suitable for measuring bend angles or other similar functions where absolute precision of a vertical, horizontal, or angled line is unnecessary.

In one application, a torpedo level may be used to determine a small angle of inclination, such as the desired inclination of a pipe for draining wastewater or sewage. The inclination for such a pipe is typically a 1 to 2 degree angle. One common method of determining the inclination in this application is measuring the length of pipe versus the drop. For example, to obtain an inclination of about 1 degree, a pipe must drop about 0.25 inches per 12 inches (1 cm per 48 cm) of length. This is presently a fairly complicated process, using both hands and one or more tools.

One prior art leveling device, U.S. Pat. No. 4,653,193, attempted to address this problem by adding ramp structures to the sides of a torpedo level. The ramp structure inclines the level relative to a pipe when the level is laid on its side on the pipe. If the pipe is thereafter moved to bring the level to horizontal, the pipe assumes the ramp's inclination angle, which is the desired angle for mounting the pipe. The ramp on each side is not retractable or removable. This property diminishes one's ability to use the sides of the level as a straight edge for marking, may hamper storage or easy removal from storage, and may easily become damaged, broken, or worn down during normal use.

Another prior art leveling device, Great Britain Patent Application No. 2,276,451 attempted to address this problem using a scale means and reversibly movable member such as a micrometer screw to indicate a value based on a distance from one end of the movable member to an abutment surface. The required scale means is preferably calibrated to indicate an inclination as a vertical to horizontal ratio. The adjustable scale means requires looking at the scale and a finer adjustment than a step-wise adjustable movable member with pre-set increments that do not require looking at a scale.

SUMMARY OF THE INVENTION

The present invention provides a spirit level device useful for easily, one-handedly determining a slight inclination. The device has an unhindered peripheral shape and an adjustable, retractable means for determining the slight inclination. Certain embodiments are adapted for use with leveling, including determining a specific inclination, of ferrometallic pipes such as water pipes, drain pipes or electrical conduit.

The present invention contemplates a spirit level comprising: an elongated body having at least one longitudinal leveling face; at least one spirit vial disposed within said body and oriented to determine whether the leveling face is level; and at least one inclination peg retractably mounted in said body, said inclination peg configured to selectably extend at least partially out from said leveling face by at least one predetermined stepwise increment; wherein said at least one inclination peg, when contacting a surface to be leveled, raises the leveling face to a predetermined angle of inclination from the surface to be leveled.

The present invention also contemplates a spirit level comprising: an elongated body having at least one longitudinal leveling face; at least one spirit vial disposed within said body and oriented to determine whether the leveling face is level; and at least one inclination peg retractably mounted in said body, said inclination peg configured to selectably extend at least partially out of an opening defined in said leveling face by at least one predetermined stepwise increment; wherein said at least one inclination peg, when contacting a surface to be leveled, raises the leveling face to a predetermined angle of inclination from the surface to be leveled.

In addition, the present invention contemplates an inclination mechanism for a spirit level having at least one leveling face, said mechanism comprising: an inclination peg retractably mounted within an opening defined in said leveling face, said inclination peg being movable between a retracted position and at least one extended position relative to the leveling face; wherein a difference between the retracted position and the at least one extended position comprises a predetermined stepwise increment; a retention means for engaging the inclination peg; and a biasing means for biasing said retention means toward the inclination peg such that when said retention means engages said inclination peg, the inclination peg is in at least one of the retracted position and the at least one extended position relative to the leveling face.

The present invention also contemplates a method of leveling a pipe at a predetermined angle of inclination comprising the steps of: providing a pipe to be leveled to a predetermined angle of inclination; providing a spirit level body having: at least one leveling face; at least one spirit vial disposed within said body, and configured to gauge the orientation of said leveling face relative to horizontal; and at least one inclination peg retractably mounted in said body, said inclination peg configured to selectively extend from said leveling face relative to the pipe; wherein said at least one inclination peg, when extended against a longitudinal surface of the pipe to be leveled, raises the leveling face to a predetermined angle of inclination from said surface; placing the spirit level on the pipe such that at least a portion of the leveling face is in contact with the pipe; extending said at least one inclination peg against the pipe, thereby inclining the leveling face from the pipe at a predetermined angle of inclination; adjusting the pipe to the predetermined level of inclination by moving the pipe until the spirit level indicates that the predetermined level of inclination is achieved; removing the spirit level from the pipe; and retracting the inclination peg.

DETAILED DESCRIPTION OF THE DRAWINGS AND THE PRESENTLY PREFERRED EMBODIMENTS

Figure 1:
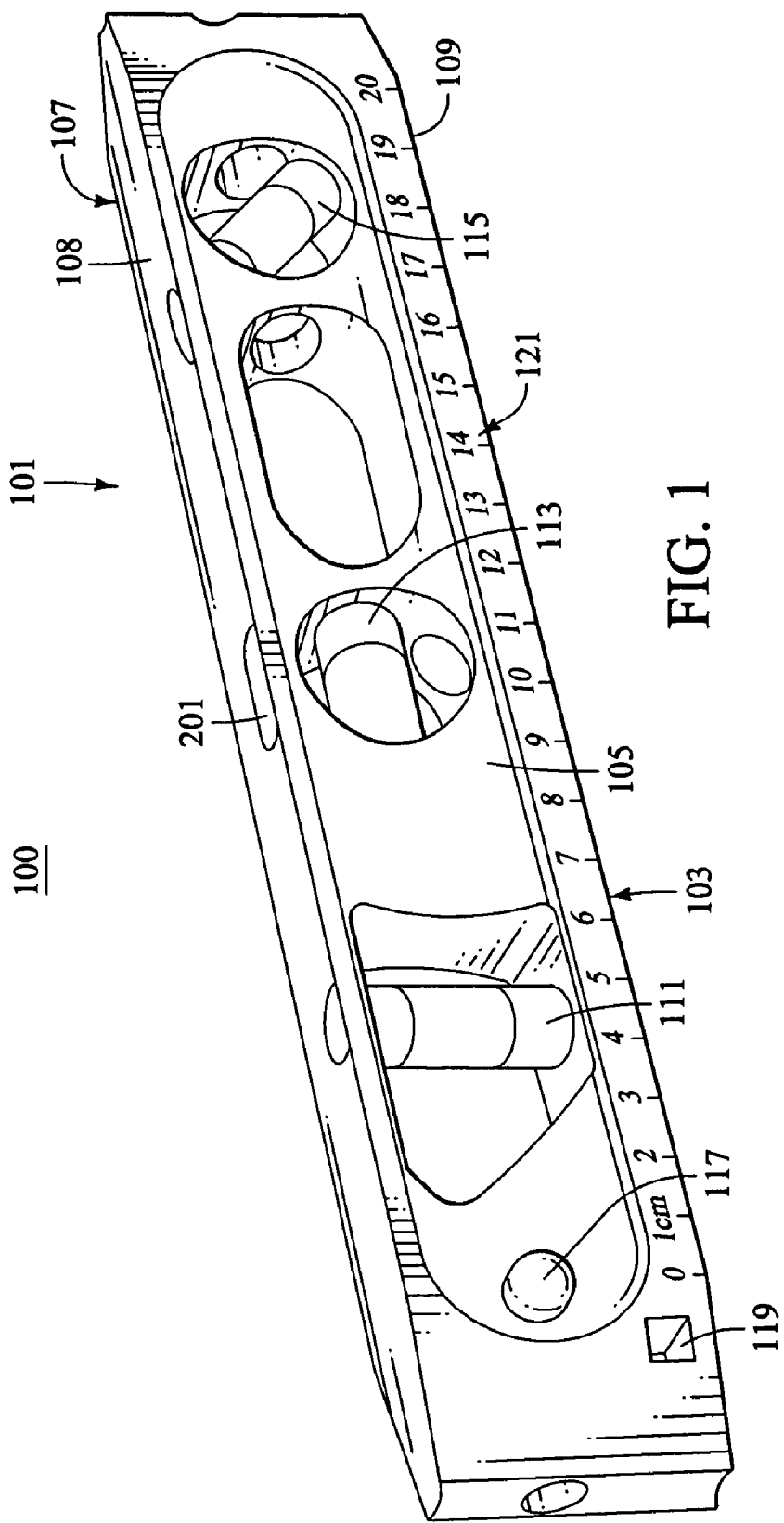
FIG. 1 is a top perspective view of a spirit level incorporating the present invention.
Figure 2:
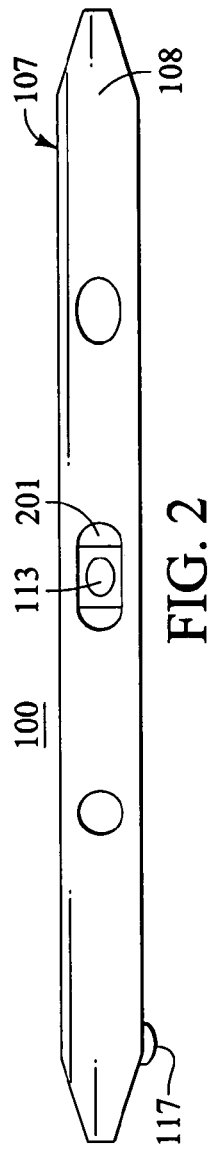
FIG. 2 is a top view thereof.

FIGS. 1–3B illustrate one embodiment of the spirit level 100. The spirit level 100 has an elongated body 101, which includes a top leveling face 107 and a bottom leveling face 109. A longitudinal side leveling face 103 is defined on the body 101. In the embodiment illustrated, the leveling face 103 includes a rounded longitudinal groove 105, having a curved cross-section which adapts the leveling face 103 to accommodate a rounded surface to be leveled, such as the outside of a pipe. As illustrated, top leveling face 107 incorporates a longitudinal rounded groove 108 to accommodate a rounded surface to be leveled. Top leveling face 107 also includes an aperture 201 through which spirit vial 113 may be viewed.

As with most conventional levels, the spirit level 100 incorporates three spirit vials disposed in the elongated body 101 and oriented for use in determining inclination whether a leveling face is level. A spirit vial 111 is mounted at a 90-degree angle relative to the leveling faces 107 and 109. A spirit vial 113 is mounted parallel relative to the leveling faces 107 and 109. A spirit vial 115 is mounted at a 45-degree angle relative to the leveling faces 107 and 109.

The spirit level 100 incorporates a rectilinear bore 119 that is adjacent to one end of body 101 and is adapted for use as a valve key. In one embodiment, the bore 119 is sized to accommodate a standard B-tank valve, thereby functioning as a valve key for adjusting a valve. In alternate embodiments, the bore 119 is sized to accommodate other valve sizes. In a further alternative embodiment, the bore 119 may be a non-rectilinear shape. In an embodiment incorporating a bore 119, the bore 119 may be used as a hang hole, for hanging the spirit level 100 from a nail or other suitably sized protrusion.

The spirit level 100 also has a retractable/extendable inclination peg 117. As illustrated in FIG. 3B, the side of the spirit level 100 opposite the side of the leveling face 103 is substantially a mirror image of that side, having a leveling face 303 which incorporates a rounded longitudinal groove 305 having a curved cross section to accommodate a rounded surface to be leveled.

Figure 3A:
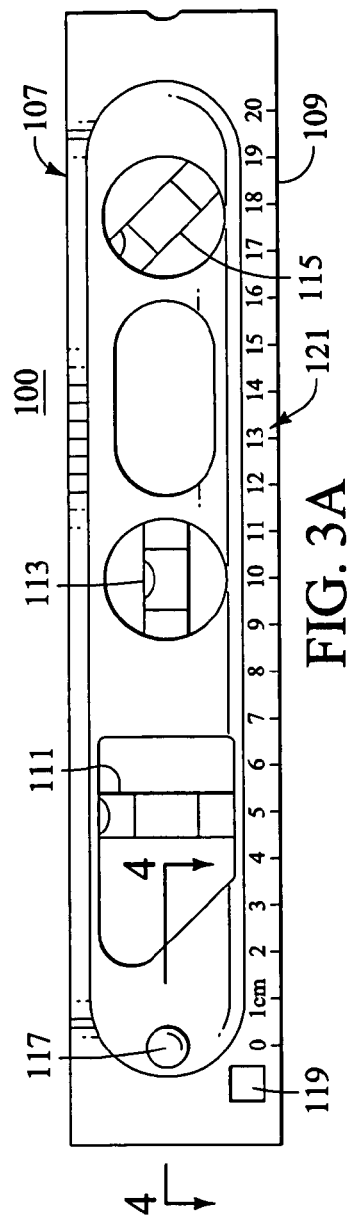
FIG. 3A is a first side view thereof.
Figure 3B:
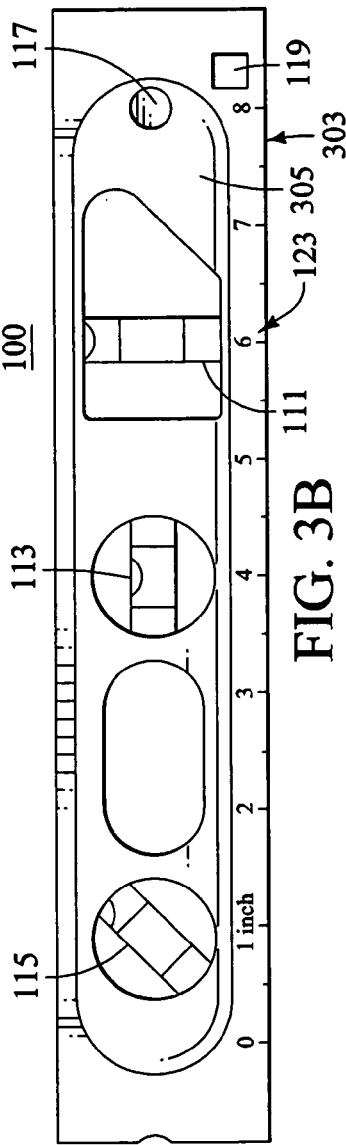
FIG. 3B is a second side view thereof.

As shown in FIGS. 1 and 3A, the spirit level 100 may include a measuring scale 121 marked on the surface of the leveling face 103. The measuring scale 121 is marked in metric (SI) units. As shown in FIG. 3B, the level 100 also includes a measuring scale 123 marked on the surface of the leveling face 303. The measuring scale 123 is marked in SAE (English) units. In alternative embodiments, specific unit fractions of the measuring scale used may also be marked on a surface of the level 100. One of skill in the art will recognize that other embodiments of marking a measuring scale are possible. One of skill in the art will also recognize that the indication of specific units of length in association with the measuring scale feature illustrated in FIGS. 1, 3A, and 3B is not intended to limit the sizes of this or other embodiments of the level 100. In another alternative embodiment, the surface of the level 100 may include markings like those on a protractor indicating angles relative to specific point on the surface of the level 100.

Figure 4:
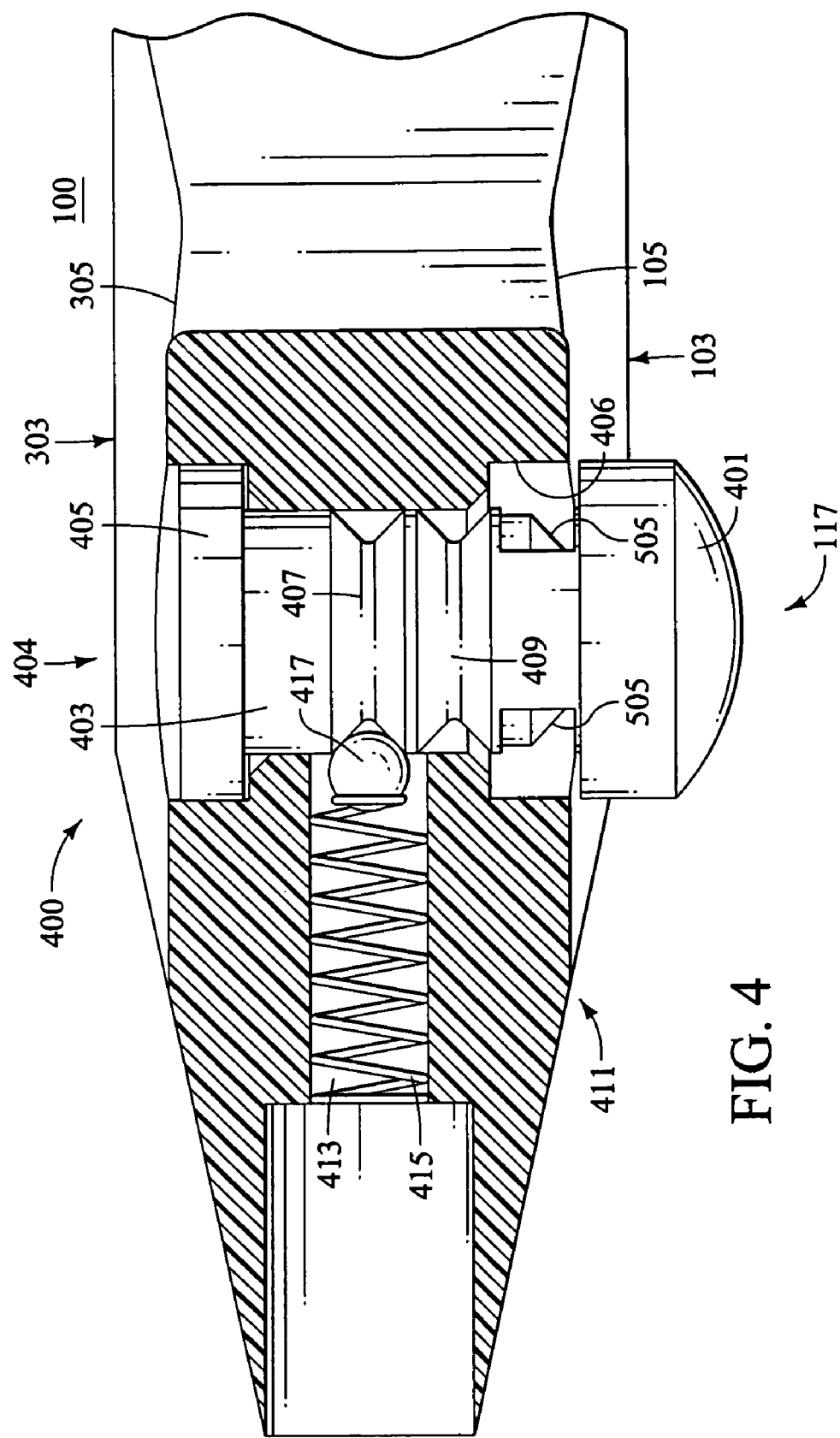
FIG. 4 is a top, cross-sectional detail view of a first embodiment of an inclination mechanism in accordance with the invention along line 4—4 of FIG. 3A.
Figure 6:
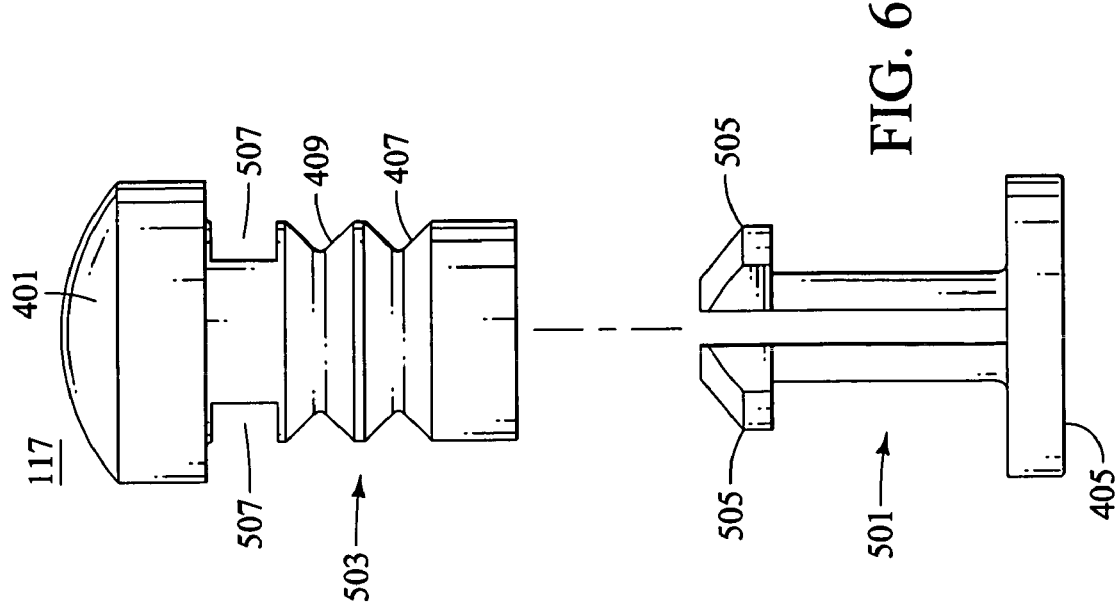
FIG. 6 is a side view thereof.
Figure 5:
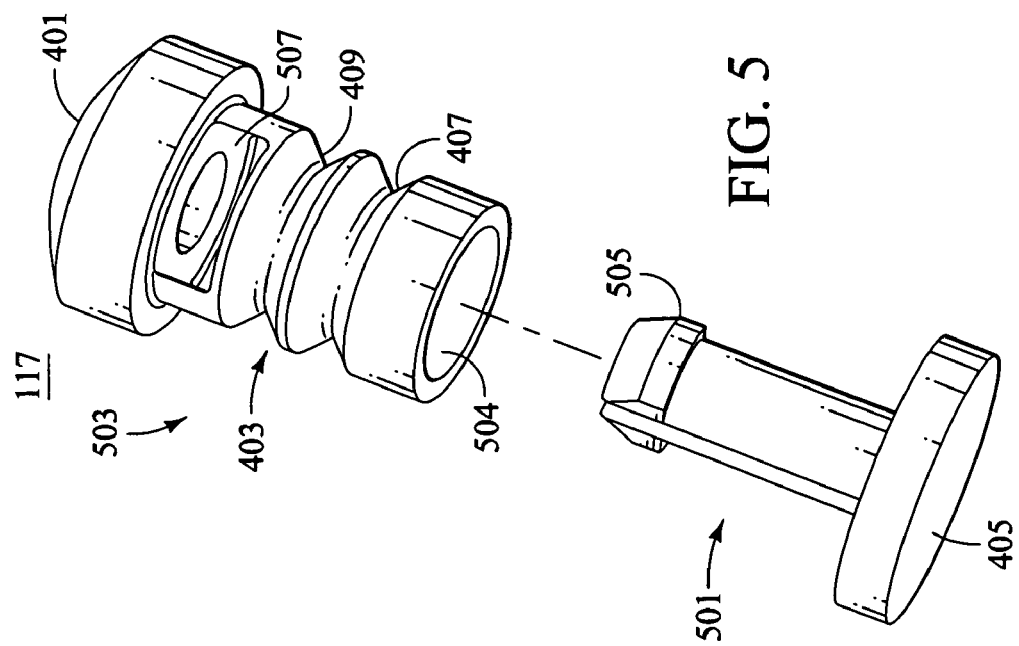
FIG. 5 is an exploded perspective view of an inclination peg component of the inclination mechanism.

FIGS. 4–6 illustrate one embodiment of inclination peg 117. FIG. 4 is a transverse cross-sectional view of one end of spirit level 100, incorporating inclination peg 117 as part of an inclination mechanism 400. The inclination peg 117 is retractably mounted in the body 101. The level body 101 incorporates a channel 404, which extends perpendicularly between and opens to the leveling faces 103 and 303. The illustrated embodiment of the inclination peg 117 includes a flanged button 401, a cylindrical peg body 403 transversing the channel 404, and a flanged inclination foot 405. The button 401 protrudes through the longitudinal groove 105 in the leveling face 103. The inclination peg 117 is illustrated in FIG. 4 in a retracted position such that the inclination foot 405 does not extend beyond the surface of the longitudinal groove 305 in the leveling face 303. The cylindrical peg body 403 includes two indentations, illustrated in this embodiment as adjacent annular grooves 407 and 409. Other embodiments are, of course possible, such as rounded annular grooves or notched indentations. The inclination mechanism 400 incorporates a retention mechanism 411 to hold the inclination peg 117 in one of a retracted or extended position. In other embodiments, the inclination peg 117 may have multiple extended positions, corresponding to multiple indentations. Each indentation provides for the inclination peg to be selectably extended at least partially out of an opening in or out from the leveling face 303 by a predetermined stepwise increment. Other types of locking or retention mechanisms are possible.

Figure 11:
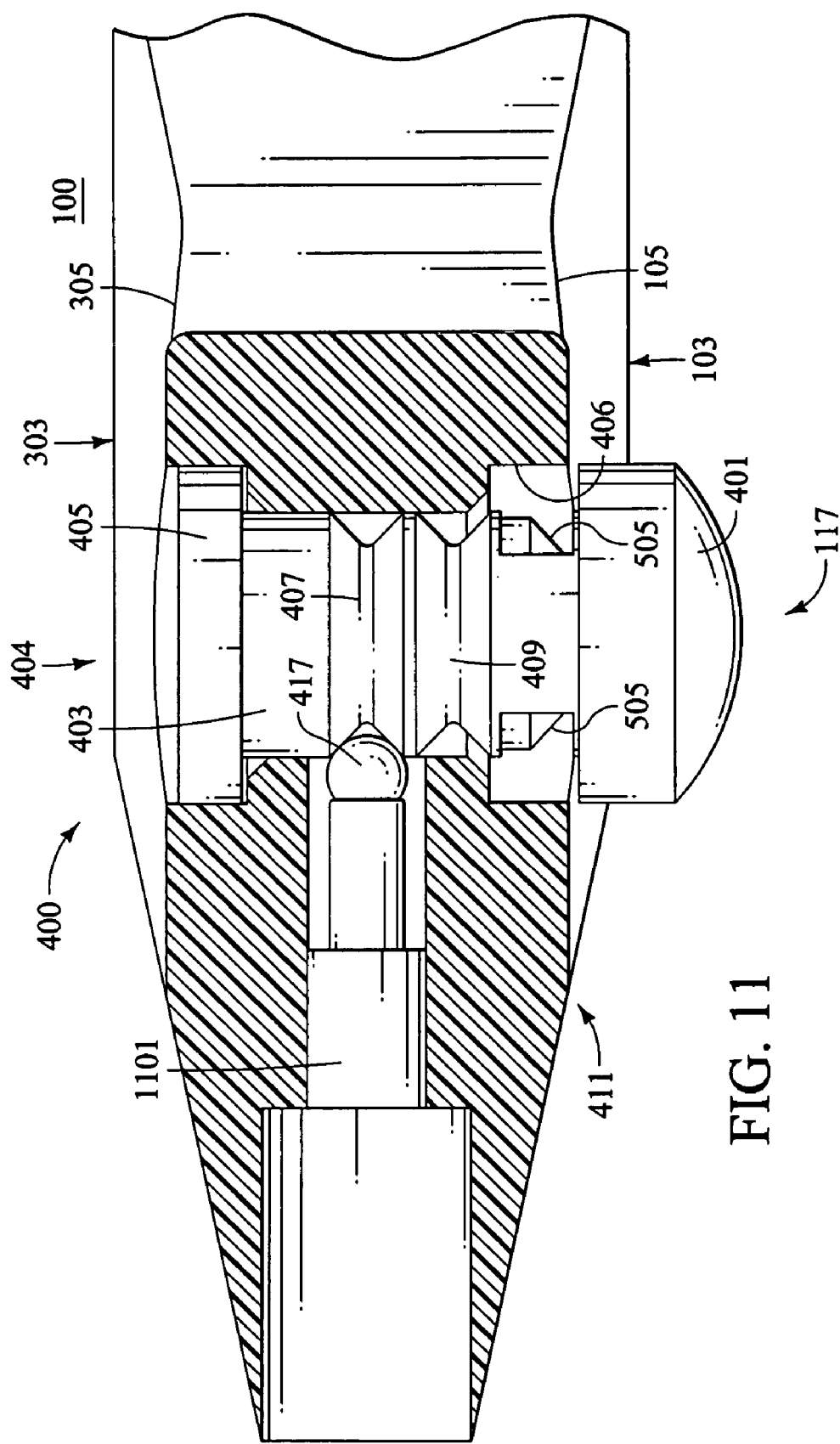
FIG. 11 is a top, cross-sectional detail view of yet another alternative embodiment of an inclination mechanism in accordance with the invention along line 4-4 of FIG. 3A.

In the illustrated embodiment, retention mechanism 411 is a ball plunger 411. The ball plunger 411 is mounted in a chamber 413. The chamber 413, which is defined by the body 101, oriented along the central longitudinal axis of the spirit level 100, perpendicular to the peg body 403 of the inclination peg 117. The ball plunger 411 in the chamber 413 comprises a biasing means adjacent to the peg body 403, embodied in this figure as a compressed coil spring 415. In alternative embodiments, the biasing means may be a leaf spring, or as illustrated in FIG. 11, a hydraulic or a pneumatic piston 1101. Other embodiments of the biasing means are possible as well.

A member, illustrated here as ball 417, serves as a retention means, and is positioned between the spring 415 and the groove 407 of the peg body 403. The spring 415 exerts a biasing force on the ball 417, urging it against the inclination peg 117. The ball 417 in turn holds the inclination peg 117 in place by engaging one of the grooves 407 and 409. When the ball 417 is engaged with the groove 407, the inclination peg 117 is in a retracted position. When the ball 417 is engaged with the groove 409, the inclination peg 117 is in an extended position such that the inclination foot 405 protrudes by a predetermined stepwise increment beyond the longitudinal groove 305 of the leveling face 303. One of skill in the art will readily appreciate that the extension by a predetermined stepwise increment of inclination peg 117 against a surface will result in the body 101 of the level 100 being raised to a corresponding predetermined inclination.

A user may move the inclination peg 117 from the retracted to the extended position by exerting force on the button 401 sufficient to overcome the biased engagement of the ball 417 with the groove 407, moving the inclination peg 117 so that the ball 417 becomes engaged with groove 409. A user may retract the inclination peg 117 by exerting force on the inclination foot 401 such that the ball 417 disengages from the groove 409 and re-engages the groove 407. The flanged nature of the button 401 and the inclination foot 405 prevents the inclination peg 117 from falling out or being pushed out of either end of the channel 404. A pair of inset shoulders 406 is defined by the body 101 in the channel 404. The inset shoulders 406 prevent the button 401 from moving all the way through the channel 404.

FIGS. 5–6 provide an exploded detail illustration of the embodiment of the inclination peg 117 shown in FIG. 4. The inclination peg 117 as shown is preferably constructed from two separate pieces, which are able to be connected together while the inclination peg 117 is being assembled to chamber 404 of the illustrated embodiment. The two separate pieces are here embodied as a male member 501 and a female member 503. The male member 501 has at one of its ends the inclination foot 405 of inclination peg 117. Two tabs 505 are at the end of the male member 501 opposite the inclination foot 405. The female member 503 comprises the button 401 and the peg body 403, which includes a central channel 504 and the grooves 407 and 409. The female member also includes two slots 507 adjacent the button 401. The male member 501 is adapted to lockingly engage the female member 503 when inserted into the central channel 504 of the female member 503. Specifically, the tabs 505 are sized and shaped to lockingly engage the slots 507.

As illustrated in FIG. 4, when the inclination peg 117 is assembled to the spirit level 100, the laterally projected flanged structure of the button 401 and the inclination foot 405 prevent the inclination peg 117 from sliding entirely out through either of the leveling faces 103 and 303 of the spirit level 100 because each flanged structure is wider than the channel 404. The inset shoulders 406 of the channel 404 prevent the button 401 from passing completely through the channel 404.

In a preferred application, inclination peg 117 is assembled to spirit level 100 in the following manner. Female member 503 is inserted into channel 404 such that button 401 protrudes through leveling face 103. Male member 505 is inserted into channel 404 on the side of leveling face 303 such that tabs 505 pass through channel 504 of female member 503 and lockingly engage slots 507. Leveling face 303 preferably has a surface indentation around channel 404 such that inclination foot 405 does not protrude beyond leveling face 303 when inclination peg 117 is in a retracted position.

In one exemplary application, illustrated in FIGS. 7A–7D, a user may use spirit level 100 to set a drain pipe 701 at a predetermined inclination. In the exemplary application, the desired predetermined inclination is 1 degree. Throughout the process, the user may read spirit vial 113 either through aperture 201 or from the side of leveling face 103 to determine the inclination of spirit level 100 relative to horizontal.

Figure 7A:
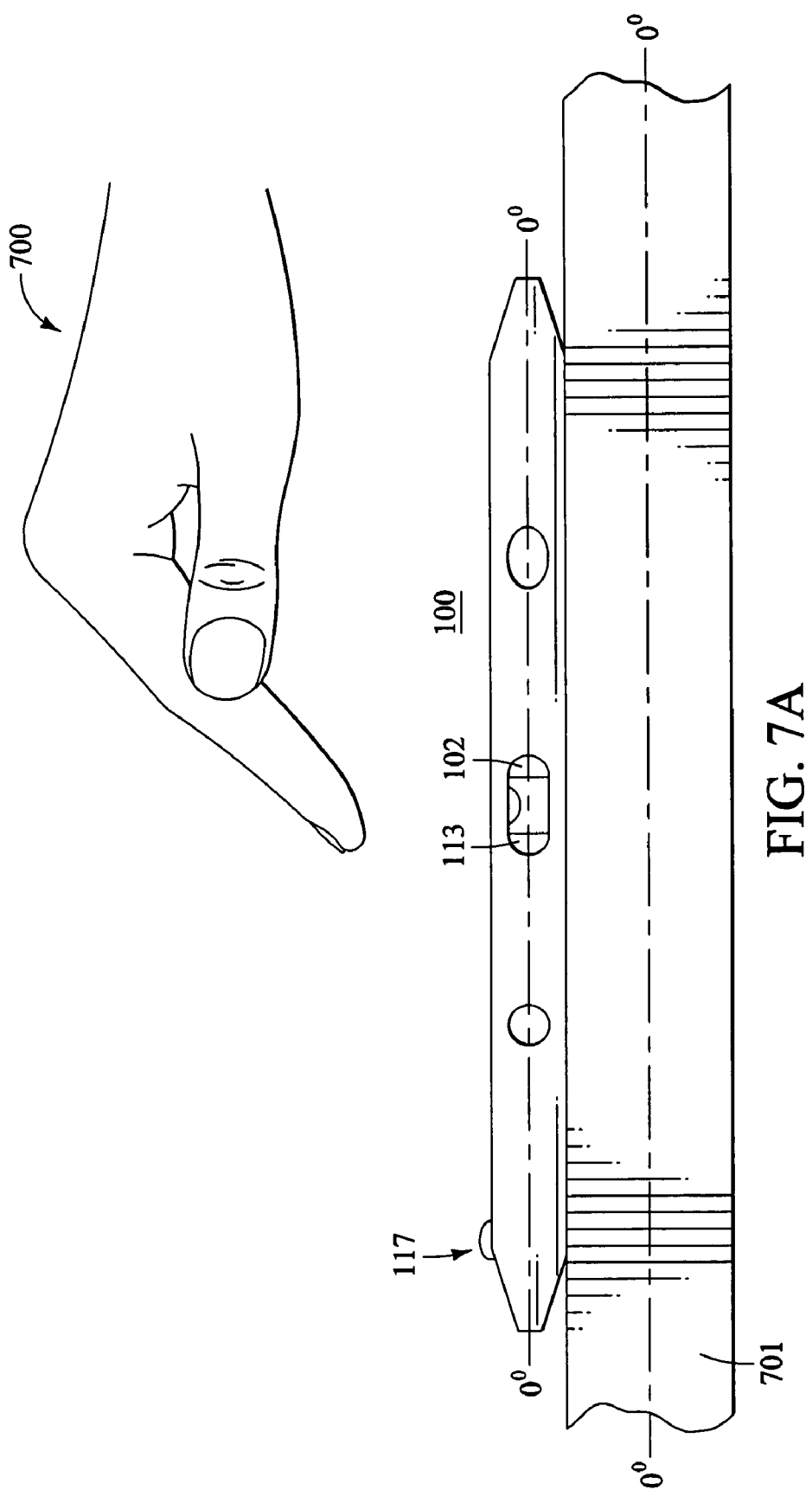
FIGS. 7A–D illustrate a side view of a method of using a spirit level to set a pipe at a predetermined inclination.
Figure 12:
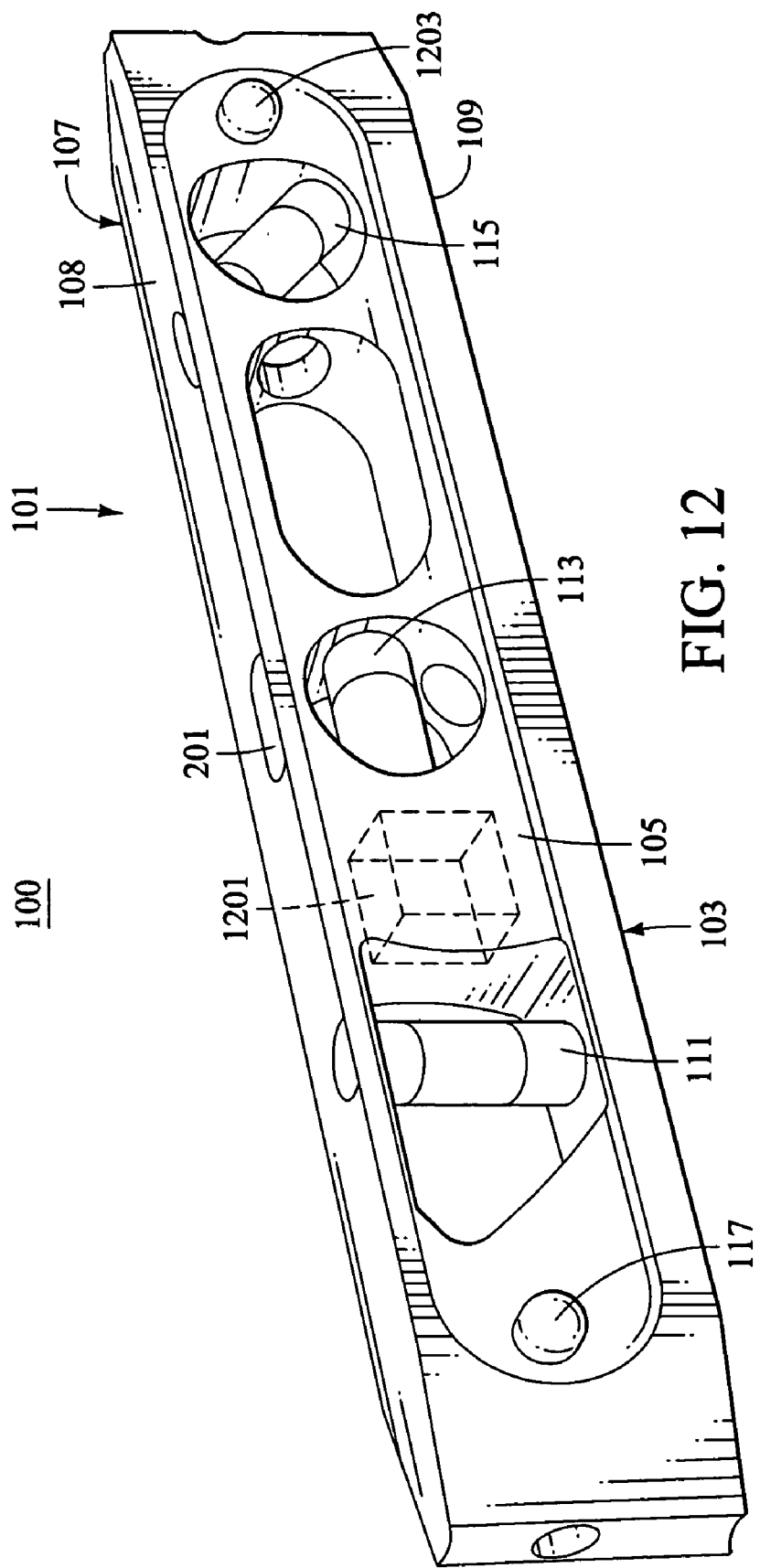
FIG. 12 is a top perspective view of a spirit level illustrating an alternative embodiment of the present invention.

In FIG. 7A, the user 700 places the pipe 701 approximately horizontal and places the spirit level 100 on top of the pipe 701. The spirit level 100 is positioned such that the rounded groove 305 (not seen) of the leveling face 303 (not seen) rests along the central longitudinal line of a top rounded surface of the pipe 701. The spirit level 100 is oriented such that the retracted inclination peg 117 is at what is intended to be the lower portion of the desired 1-degree inclination. In an alternative embodiment of the method, the body 101 of the spirit level 100 includes one or more magnets, and may be magnetically adhered to a bottom surface of the pipe 701. (Such an alternative embodiment is illustrated in FIG. 12, where magnet 1201 is disposed in the body 101 of level 100.) In this alternative embodiment, the user 700 orients the spirit level 100 such that the retracted inclination peg 117 is at what is intended to be the higher portion of the desired 1-degree inclination. In another alternative embodiment, the inclination peg 117 includes at least one magnet that can magnetically adhere toward the pipe (see inclination peg magnet 909 illustrated in FIG. 9). Then, the user 700 uses the spirit level 100 to adjust the pipe 701 to horizontal, such that the spirit level 100 and the pipe 701 are each at a 0-degree inclination.

Figure 7B:
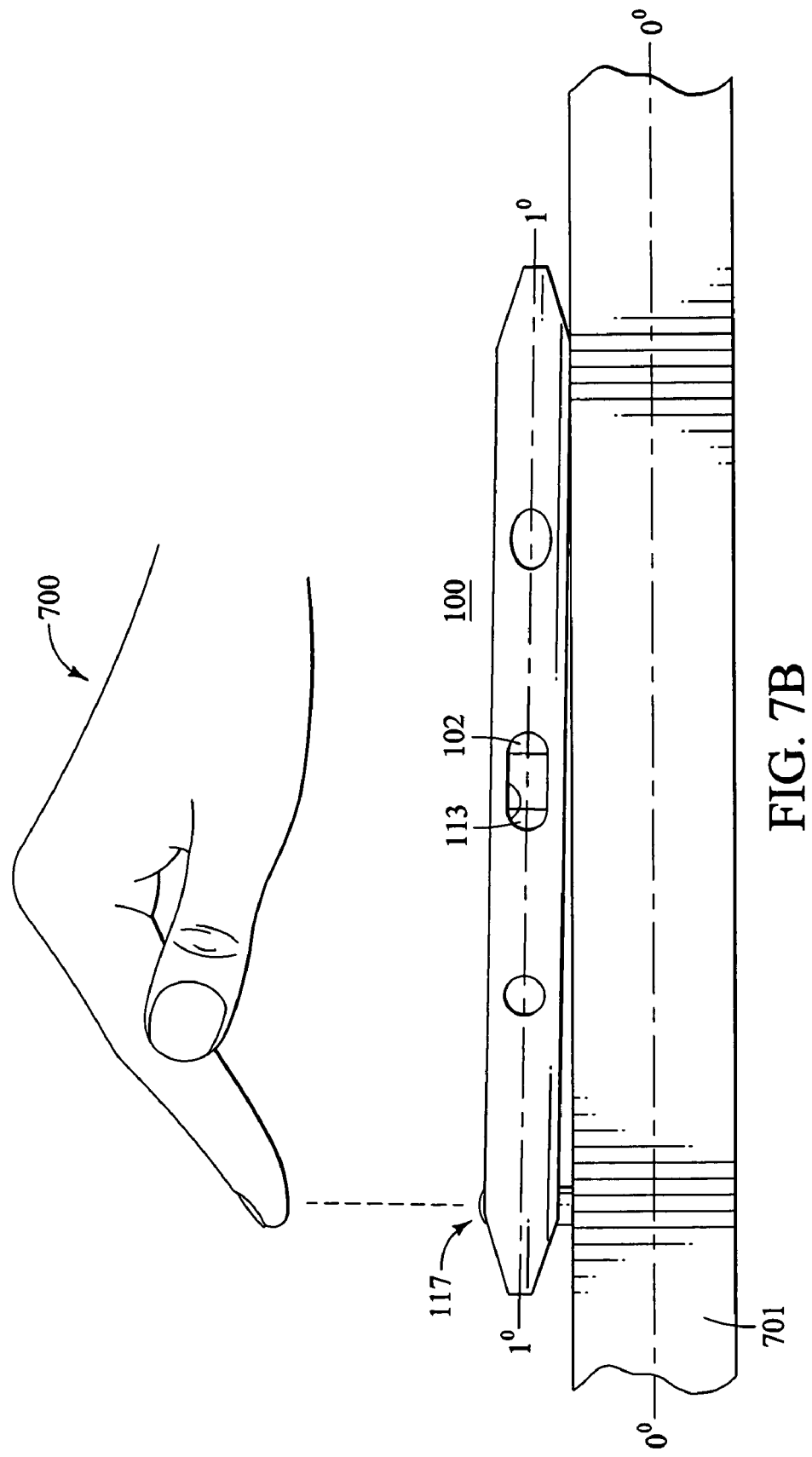
Figure 7C:
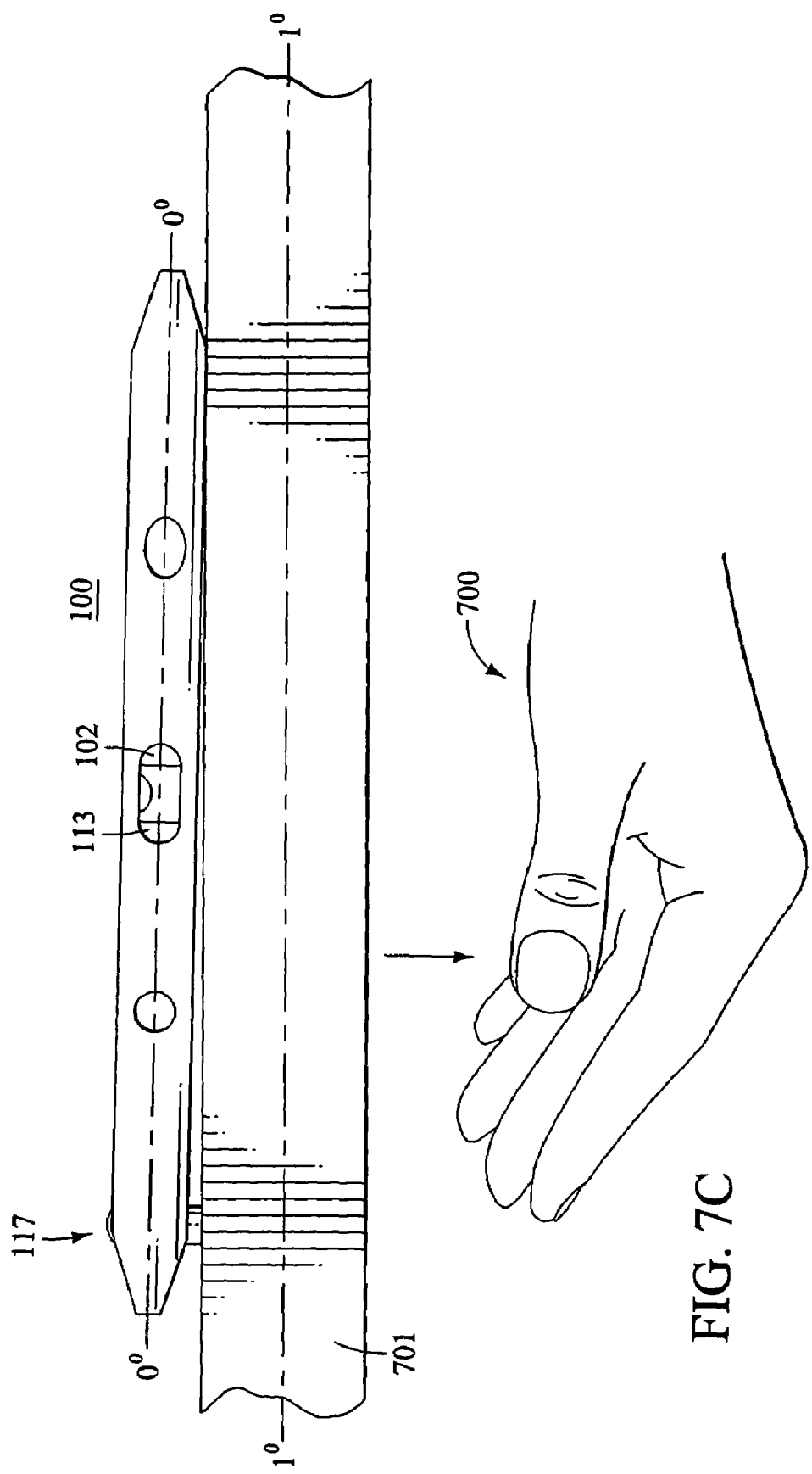
Figure 7D:
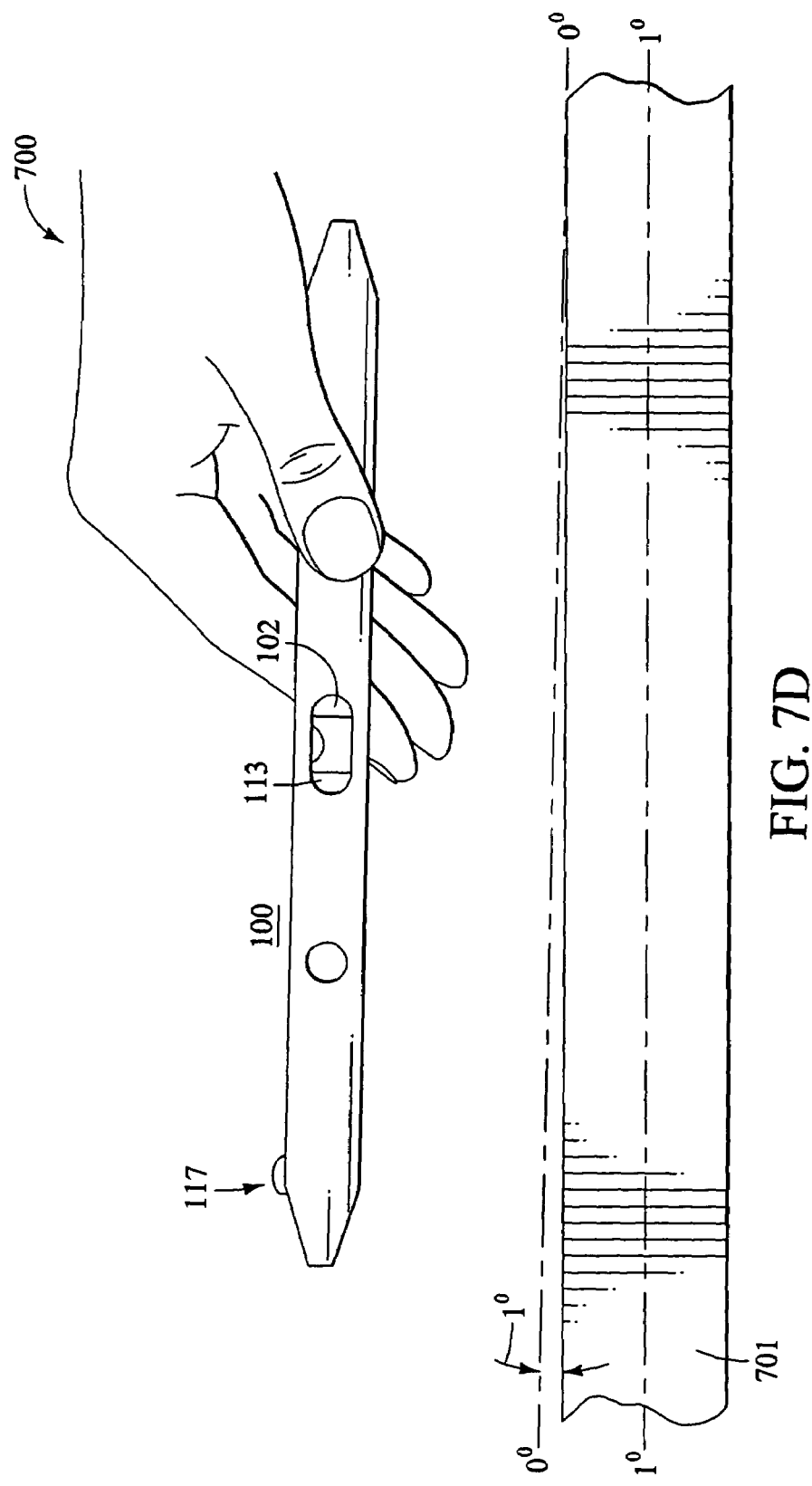

As shown in FIG. 7B, the user 700 extends the inclination peg 117 to an extended position so that the spirit level 100 is angled at a desired inclination, illustrated here as a 1-degree inclination from pipe 701 which remains level, at a 0-degree inclination (note that the illustration of the angle is intentionally not to scale). One skilled in the art will readily understand the how far inclination peg 117 must extend from the leveling face 303 to raise the level 100 to this inclination. Specifically, the skilled artisan will appreciate that extending the inclination peg 117 such that it protrudes from the leveling face 303 by a predetermined increment will incline the level 100 from the pipe at a corresponding predetermined angle. Of course, the relationship of the predetermined incremental extension to the predetermined angle is determined by the distance that inclination peg 117 is mounted from the end of the level 100. As shown in FIG. 7C, the user 700 then repositions and sets the pipe 701, with the level 100 on it, in a manner that brings spirit level 100 to horizontal, thereby placing pipe 701 at the desired 1-degree inclination. As shown in FIG. 7D, the user 700 removes the spirit level 100 from the pipe 701 and retracts the inclination peg 117.

In some alternative embodiments, the body 101 of the spirit level 100 contains at least one magnet to enhance the utility of the level 100 with leveling ferrometallic conduit or pipe. In one such embodiment, magnets are mounted in the body 101 and oriented such that the leveling face 303 will magnetically adhere to a ferrometallic surface. In another such embodiment, magnets are mounted in the body 101 and oriented such that at least one of the leveling side 107 and the leveling side 109 will magnetically adhere to a ferrometallic surface. In a different embodiment, the inclination peg 117 incorporates one or more magnets.

Figure 8:
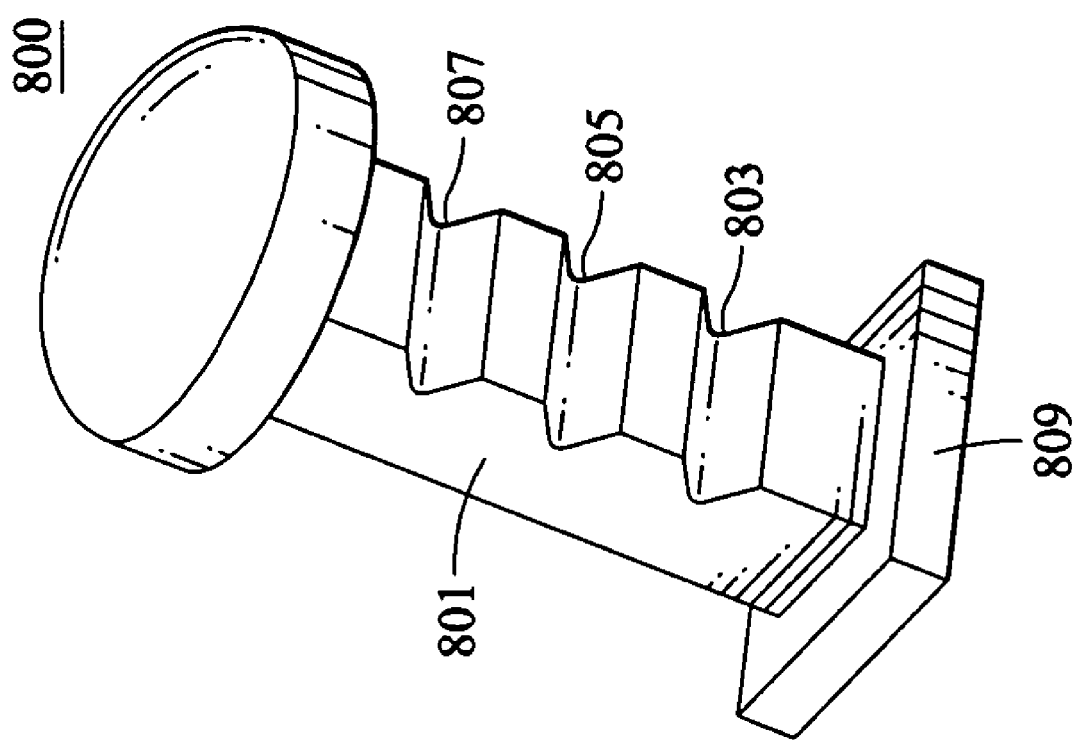
FIG. 8 is side view of an alternative embodiment of an inclination peg component of the inclination mechanism having a polygonal peg body.

FIG. 8 shows an alternative embodiment of the inclination peg, illustrated as an inclination peg 800. Each of the alternative features composited in this embodiment may be used in other embodiments of the inclination peg. The illustrated lateral body periphery of the inclination peg 800 is a shape other than cylindrical. As illustrated, the body periphery is a polygon such as a square body 801. Alternatively the body periphery may be rectangular, hexagonal, or otherwise polygonally shaped. In another alternative, the body may be curvilinear such as elliptical, obround, or reniform. In another series of alternative embodiments contemplated, the inclination peg contains different sets of indentations, allowing the inclination peg to confer different desired specific inclinations. In the embodiment of FIG. 8, the inclination peg 800 contains indentations embodied as notches 803, 805, and 807 on one side of the body 801, wherein when a retention mechanism engages the notch 803, the inclination peg 800 is in a retracted position. When mounted in a spirit level and the retention mechanism engages the notch 805, the inclination peg 800 is in a first extended position and imparts a first inclination. When the retention mechanism engages the notch 807, the inclination peg 800 is in a second extended position and imparts a second inclination greater than the first inclination. As illustrated, the inclination foot 809 is rectilinear.

Figure 9:
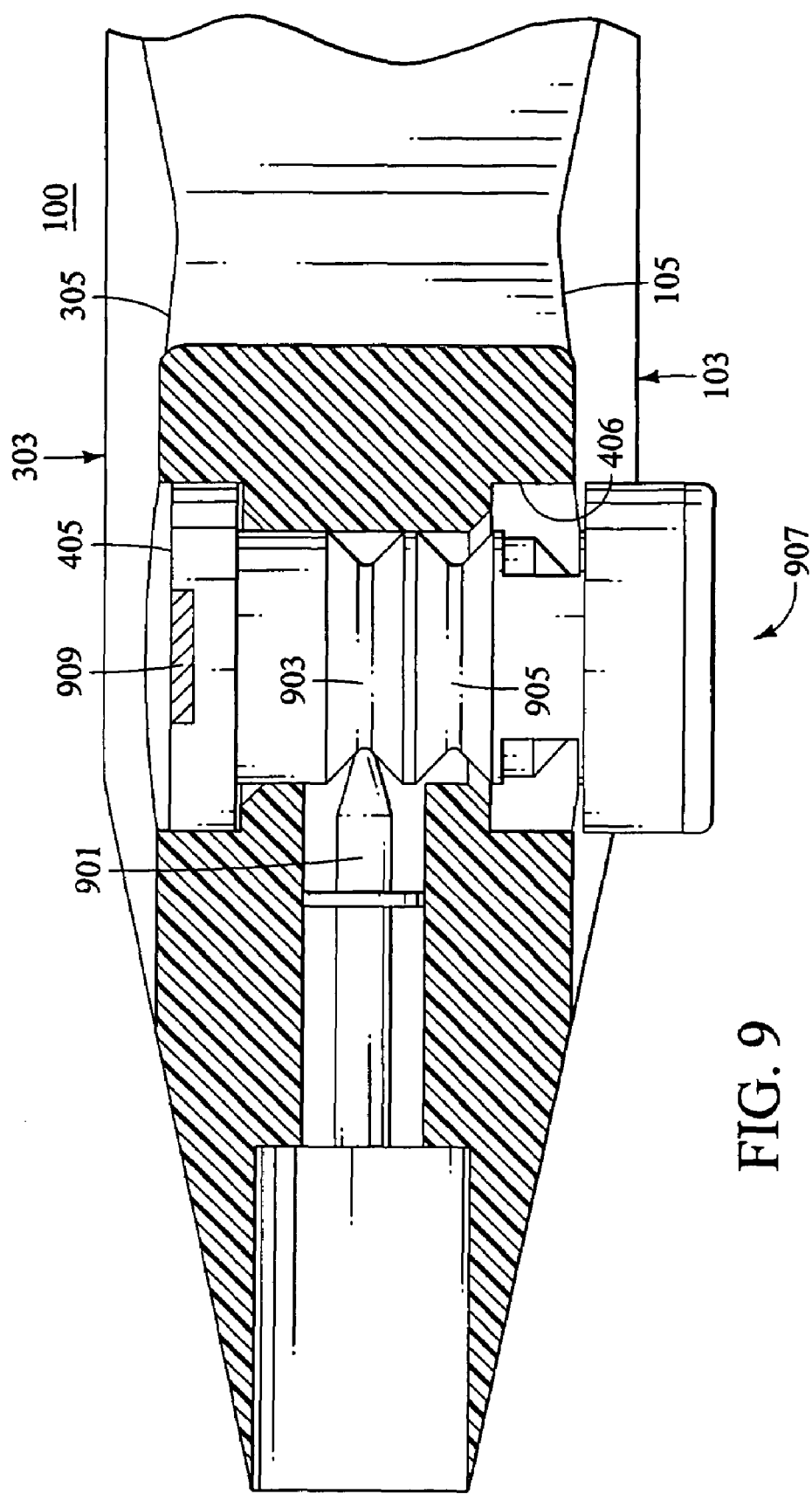
FIG. 9 is a top, cross-sectional detail view of an alternative embodiment of an inclination mechanism in accordance with the invention along line 4—4 of FIG. 3A.

In one alternative embodiment of the retention mechanism, illustrated in FIG. 9, the retention means is a locking tang 901 that engages individually with the indentations 903 and 905 in the body of the inclination peg 907. As illustrated, the body of the inclination peg 109 has an obround cross-section, and has a magnet 909 disposed in the inclination foot 405. The locking tang 901 is a limitedly flexible plastic tab mounted adjacent to, and capable of engaging the inclination peg. Alternative embodiments of the locking tang are also possible, such as, for example, a straight metal tab or a bent metal tab.

Figure 10:
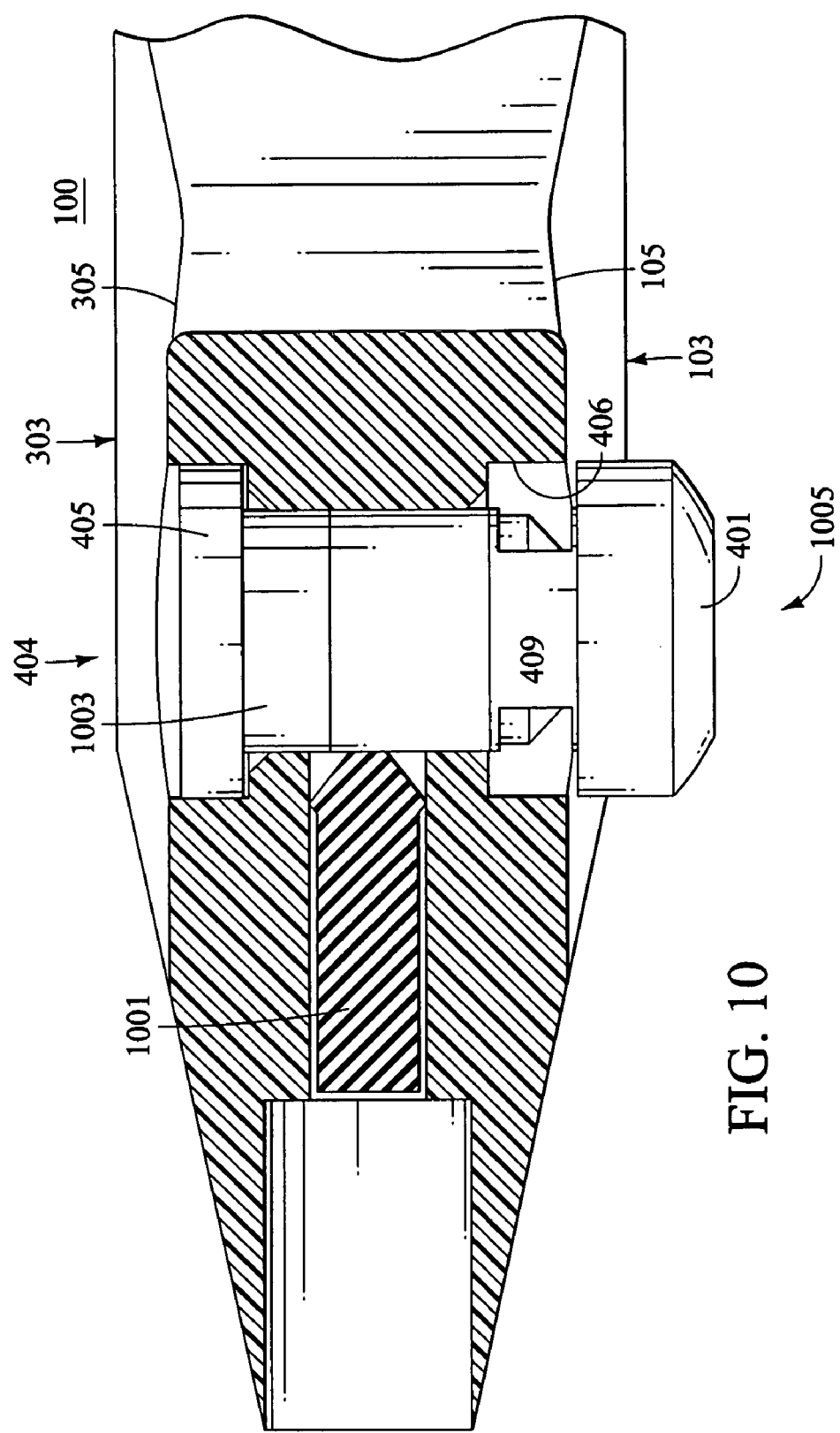
FIG. 10 is a top, cross-sectional detail view of another alternative embodiment of an inclination mechanism in accordance with the invention along line 4—4 of FIG. 3A.

In another alternative embodiment of the inclination mechanism, illustrated in FIG. 10, the retention means is a frictional retention means shown as a rubber finger 1001. The frictional retention means may also be embodied as, for example, a snugly fitting rubber gasket or a polymer finger frictionally contacting the peg body 1003 in a manner that prevents the inclination peg 1005 from moving within the channel 404 without a user's exertion of force thereupon. In FIG. 10, the illustrated peg body 1003 has an elliptical cross-sectional shape. In this embodiment, the predetermined inclination is determined by the length of the inclination peg 1005, the position of the flanged button 401 relative to the inset shoulders 406, and the flanged inclination foot 405 relative to the body 101 of the spirit level 100. When the inclination foot 405 does not protrude beyond the leveling face 103, the inclination peg 1005 is in a retracted position. When the inclination peg 1005 is oriented so that the flanged button 401 is firmly against the inset shoulders 406, the inclination peg 1005 is in an extended position that will confer the predetermined inclination.

In another alternative embodiment, illustrated in FIG. 12, the spirit level has two inclination pegs—one near each of the opposite ends of the level body 101. The increment(s) to which the first inclination peg 117 may be extended may be the same as or different than the increment(s) to which the second inclination peg 1203 may be extended. Each of the two inclination pegs is independently retractably extendable from the leveling face by at least one predetermined stepwise increment. In a further embodiment, there is preferably a marking on each inclination peg or on the body of the spirit level adjacent each inclination peg, denoting the angle(s) of inclination each inclination peg provides when in an extended position. In another embodiment, the increment(s) to which the first inclination peg 117 may be extended are a specific predetermined fraction of the increment(s) to which the second inclination peg 1201 may be extended. FIG. 12 also illustrates a previously mentioned alternative aspect of the level, namely having a magnet 1201 disposed in the body 101 of the level 100. In further alternative embodiments, one or more magnets may be disposed in the illustrated location, or in other locations in the body 101 of the level 100.

It is therefore intended that the foregoing detailed description be regarded as illustrative rather than limiting, and that it be understood that it is the following claims, including all equivalents, that are intended to define the spirit and scope of this invention.

The invention claimed is:

1. A spirit level comprising:
  an elongated body having at least one longitudinal leveling face extending for substantially the length of the elongated body;
  at least one spirit vial disposed within said body and oriented to determine whether the leveling face is level; and
  at least one inclination peg retractably mounted in said body, said inclination peg configured to selectably extend at least partially out from said leveling face by at least one predetermined stepwise increment to an extended position;
  wherein said at least one inclination peg, when contacting a surface to be leveled in said extended position, raises the leveling face to a known predetermined angle of inclination from the surface to be leveled such that when said spirit level determines that said leveling face is level, said surface is disposed at said predetermined angle relative to level.

2. The spirit level of claim 1 wherein the at least one leveling face comprises a longitudinally extending curved surface adapted to accommodate a rounded longitudinal surface.

3. The spirit level of claim 1 wherein said at least one inclination peg further comprises at least two inclination pegs, each of which is independently retractably extendable from said leveling face.

4. The spirit level of claim 3, wherein the at least two inclination pegs are positioned near opposite ends of the elongated body.

5. The spirit level of claim 3, wherein each of the at least two inclination pegs is marked to indicate the predetermined angel of inclination from the surface to be leveled conferred by said peg when said peg is contacting a surface to be leveled.

6. The spirit level of claim 5, wherein the predetermined increment for one of the at least two inclination pegs in different than the predetermined increment of another of the at least two inclination pegs.

7. The spirit level of claim 6, wherein a first of said at least two inclination pegs, when contacting a surface to be leveled, raises the leveling face to a first predetermined angle of inclination from the surface to be leveled, and wherein a second of said at least two inclination pegs, when contacting a surface to be leveled, raises the leveling face to a predetermined fraction of the first predetermined angel.

8. The spirit level of claim 1, wherein the elongated body comprises at least one magnet.

9. The spirit level of claim 1 further comprising a rectilinear bore adjacent one end of the body, said bore being adapted for use as a valve key.

10. The spirit level of claim 1 further comprising a bore adjacent one end of the body, said bore being adapted for use as a hang hole, whereby the spirit level may be hung from a suitably sized protrusion.

11. The spirit level of claim 1, wherein the elongated body comprises at least one surface comprising a measuring scale on a surface of said body.

12. The spirit level of claim 11, wherein the measuring scale indicates length in at least one of SAE and metric units.

13. The spirit level of claim 1 wherein said retention means for engaging the inclination peg comprises a flexible polymer finger frictionally engaging at least one surface of the inclination peg.

14. The spirit level of claim 1 wherein said retention means for engaging the inclination peg comprises a snugly fitting rubber gasket frictionally engaging at least one surface of the inclination peg.

15. The spirit level of claim 1 wherein the predetermined angle of inclination is approximately one degree.

16. The spirit level of claim 1 wherein the predetermined angle of inclination is approximately two degrees.

17. The spirit level of claim 1 wherein the predetermined angle of inclination is less than five degrees.

18. A spirit level comprising:
an elongated body having at least one longitudinal leveling face;
at least one spirit vial disposed within said body and oriented to determine whether the leveling face is level; and
and least one inclination peg retractably mounted in said body, said inclination peg configured to selectably extend at least partially out of an opening defined in said leveling face by a first predetermined stepwise increment and a second predetermined stepwise increment;
wherein said at least one inclination peg, when contacting surface to be leveled in the first predetermined stepwise increment raises the leveling face to a first predetermined angle of inclination from the surface to be leveled and when contacting surface to be leveled in the second predetermined stepwise increment raises the leveling face to a second predetermined angle of inclination from the surface to be leveled.

19. The spirit level of claim 18, wherein the at least one leveling face comprises a longitudinally extending curved surface adapted to accommodate a rounded longitudinal surface.

20. The spirit level of claim 18, wherein said at least one inclination peg further comprises at least two inclination pegs, each of which is independently retractably extendable from said leveling face.

21. The spirit level of claim 20, wherein the at least two inclination pegs are positioned near opposite ends of the elongated body.

22. The spirit level of claim 20, wherein each of the at least two inclination pegs is marked to indicate the predetermined angle of inclination from the surface to be leveled conferred by said peg when said peg is contacting a surface to be leveled.

23. The spirit level of claim 22, wherein the predetermined increment for on of the at least two inclination pegs is different than the predetermined increment of another of the at least two inclination pegs.

24. The spirit level of claim 23, wherein a first of said at least two inclination pegs, when contacting a surface to be leveled, raises the leveling face to a first predetermined angle of inclination from the surface to be leveled, and wherein a second of said at least two inclination pegs, when contacting a surface to be leveled, raises the leveling face to a predetermined fraction of the first predetermined angle.

25. The spirit level of claim 18, wherein the elongated body comprises at least one magnet.

26. The spirit level of claim 18, further comprising a rectilinear bore adjacent one end of the body, said bore being adapted for use as a valve key.

27. The spirit level of claim 18, further comprising a bore adjacent one end of the body, said bore being adapted for use as hang hole, whereby the spirit level may be hung from a suitably sized protrusion.

28. The spirit level of claim 18, wherein the elongated body comprises at least one surface comprising a measuring scale on a surface of said body.

29. The spirit level of claim 28, wherein the measuring scale indicates length in at least one of SAE and metric units.

30. A spirit level, comprising:
an elongated body having a first longitudinal leveling face;
a first spirit vial disposed within said body and oriented to determine whether the first leveling face is level;
said elongated body having a second longitudinal leveling face, said second leveling face being perpendicular to said first leveling face;
a second spirit vial disposed within said body and oriented to determine whether the second leveling face is level, said second spirit level being viewable through said first leveling face;
an inclination peg retractably mounted within an opening defined in said second leveling face, said inclination peg being movable between a retracted position and at least one extended position relative to the second leveling face;
wherein the inclination peg may be extended by at least one predetermined stepwise increment;
a retention means for engaging the inclination peg, said retention means being located within said elongated body; and
a biasing means for biasing said retention means toward the inclination peg, said biasing means being moved away from the inclination peg when said inclination peg is moved between said retracted position and said at least one extended position.

31. The spirit level of claim 30, wherein the at least one extended position comprises at least two extended positions.

32. The spirit level of claim 30, wherein the inclination peg comprises a peg body disposed between a first end and a second end.

33. The spirit level of claim 32, wherein the peg body comprises at least one indentation along said peg body for engagement with the retention means.

34. The spirit level of claim 33, wherein the retention means comprises a member extending at least partially into said at least on indentation to hold said inclination peg.

35. The spirit level of claim 33, wherein the at least one indentation comprises an annular groove.

36. The spirit level of claim 33, wherein the at least one indentation comprises at least two indentations.

37. The spirit level of claim 32, wherein each of the first end and second end comprises a flange oriented to retain the peg body within the opening.

38. The spirit level of claim 32, wherein the periphery of the peg body is substantially circular.

39. The spirit level of claim 32, wherein the periphery of the peg body is substantially polygonal.

40. The spirit level of claim 32, wherein the periphery of the peg body is a rounded shape selected from the group elliptical, obround, and reinform.

41. The spirit level of claim 30, wherein the biasing means comprises a spring disposed in the spirit level adjacent to the peg body.

42. The spirit level of claim 30, wherein the biasing means comprises a leaf spring disposed in the spirit level adjacent to the peg body.

43. The spirit level of claim 30, wherein the biasing means comprises a coil spring in the spirit level adjacent to the peg body.

44. The spirit level of claim 30, wherein the biasing means comprising at least one of a hydraulic piston and a pneumatic piston, disposed in the spirit level adjacent to the peg body.

45. The spirit level of claim 30, wherein retention means comprises a ball plunger.

46. The spirit level of claim 45, wherein said ball plunger comprises a spring exerting a biasing force through a member engaging said inclination peg.

47. The spirit level of claim 30, wherein the retention means comprises a locking tang.

48. The spirit level of claim 47, wherein said locking tang comprises a limitedly flexible tab mounted adjacent to, and capable of engaging said inclination peg.

49. The spirit level of claim 30, wherein the retention means comprises a frictional retention means comprising a flexible member, at least one surface of which frictionally engages at least one surface of said inclination peg.

50. The spirit level of claim 30, wherein the inclination peg comprises a magnet.

51. The spirit level of claim 30, wherein the inclination peg may be actuated by one hand of a user.

52. A method of leveling a pipe at a predetermined angle of inclination comprising the steps of:
   providing a pipe to be leveled to a predetermined angle of inclination;
   providing a spirit level body having at least one inclination peg retractably mounted in said body, said inclination peg configured to selectably extend by at least one predetermined increment from said leveling face relative to the pipe;
   placing the spirit level on the pipe such that said inclination peg is in contact with the pipe;
   extending said at least one inclination peg such that said leveling face is at a predetermined angle of inclination relative to said pipe when said inclination peg is in contact with the pipe; and
   adjusting the pipe to the predetermined level of inclination by moving the pipe until the spirit level indicates that the predetermined angle of inclination is achieved.

53. The method of claim 52, wherein the spirit level further comprises at least one magnet, such that when placing the spirit level on the pipe, the at least one inclination peg magnetically adheres to the pipe.

54. The method of claim 52, wherein the spirit level body provided further has at least one magnet disposed within said body, such that when placing the spirit level on the pipe, the spirit level magnetically adheres to the pipe.

55. The method of claim 54, wherein the spirit level body provided further has at least one magnet disposed within the at least one inclination peg, such that when placing the spirit level on the pipe, the at least one inclination peg magnetically adheres to the pipe.

* * * * *

UNITED STATES PATENT AND TRADEMARK OFFICE
CERTIFICATE OF CORRECTION

PATENT NO. : 7,086,166 B2
APPLICATION NO. : 10/847530
DATED : August 8, 2006
INVENTOR(S) : Eric John Helda et al.

It is certified that error appears in the above-identified patent and that said Letters Patent is hereby corrected as shown below:

Column 8, line 42, change "angel" to --angle--
Column 8, line 55, change the last word "angel" to --angle--

Signed and Sealed this

Fourteenth Day of November, 2006

JON W. DUDAS
*Director of the United States Patent and Trademark Office*